United States Patent
Schaeffer et al.

(10) Patent No.: US 12,292,823 B2
(45) Date of Patent: May 6, 2025

(54) CPLD AS ADAPTER FOR HIGH-AVAILABILITY DRIVE MANAGEMENT

(71) Applicant: DELL PRODUCTS L.P., Round Rock, TX (US)

(72) Inventors: Tobias Schaeffer, Watertown, MA (US); Michael Raineri, Westborough, MA (US)

(73) Assignee: Dell Products L.P., Round Rock, TX (US)

( * ) Notice: Subject to any disclaimer, the term of this patent is extended or adjusted under 35 U.S.C. 154(b) by 16 days.

(21) Appl. No.: 18/452,951

(22) Filed: Aug. 21, 2023

(65) Prior Publication Data

US 2025/0068553 A1    Feb. 27, 2025

(51) Int. Cl.
*G06F 12/02*    (2006.01)
(52) U.S. Cl.
CPC ................... *G06F 12/023* (2013.01)
(58) Field of Classification Search
None
See application file for complete search history.

(56) References Cited

U.S. PATENT DOCUMENTS

| | | | |
|---|---|---|---|
| 6,314,539 B1 * | 11/2001 | Jacobson | G01R 31/318541 714/727 |
| 9,852,779 B2 | 12/2017 | Lee | |
| 9,887,008 B2 | 2/2018 | Lee et al. | |
| 2020/0034253 A1 * | 1/2020 | Huang | G06F 11/0757 |
| 2024/0264823 A1 * | 8/2024 | Jiang | G06F 8/65 |
| 2024/0264824 A1 * | 8/2024 | Sun | G06F 8/654 |

\* cited by examiner

*Primary Examiner* — Stephanie Wu
(74) *Attorney, Agent, or Firm* — Larson Newman, LLP

(57) ABSTRACT

An information handling system includes a storage device having control inputs, and first and second processing nodes. The first processing node includes a first complex programmable logic device (CPLD) having first outputs and a first communication interface. Each first output is coupled to control a state of an associated control input. The second processing node includes a second CPLD having second outputs and a second communication interface coupled to the first communication interface. Each second output is coupled to control the state of the associated control input. The first CPLD receives a command to change the state of a particular one of the control inputs from a first state to a second state, directs the second CPLD to change the state of the particular control input from the first state to the second state via the first communication interface, and changes the state of the particular control input from the first state to the second state in response to directing the second CPLD to change the state of the particular control input.

20 Claims, 5 Drawing Sheets

CPLD AS ADAPTER FOR HIGH-AVAILABILITY DRIVE MANAGEMENT

FIELD OF THE DISCLOSURE

This disclosure generally relates to information handling systems, and more particularly relates to utilizing a complex programmable logic device (CPLD) as an adapter for high-availability drive management in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a storage device having control inputs, and first and second processing nodes. The first processing node may include a first complex programmable logic device (CPLD) having first outputs and a first communication interface. Each first output may be coupled to control a state of an associated control input. The second processing node may include a second CPLD having second outputs and a second communication interface coupled to the first communication interface. Each second output may be coupled to control the state of the associated control input. The first CPLD may receive a command to change the state of a particular one of the control inputs from a first state to a second state, direct the second CPLD to change the state of the particular control input from the first state to the second state via the first communication interface, and change the state of the particular control input from the first state to the second state in response to directing the second CPLD to change the state of the particular control input.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
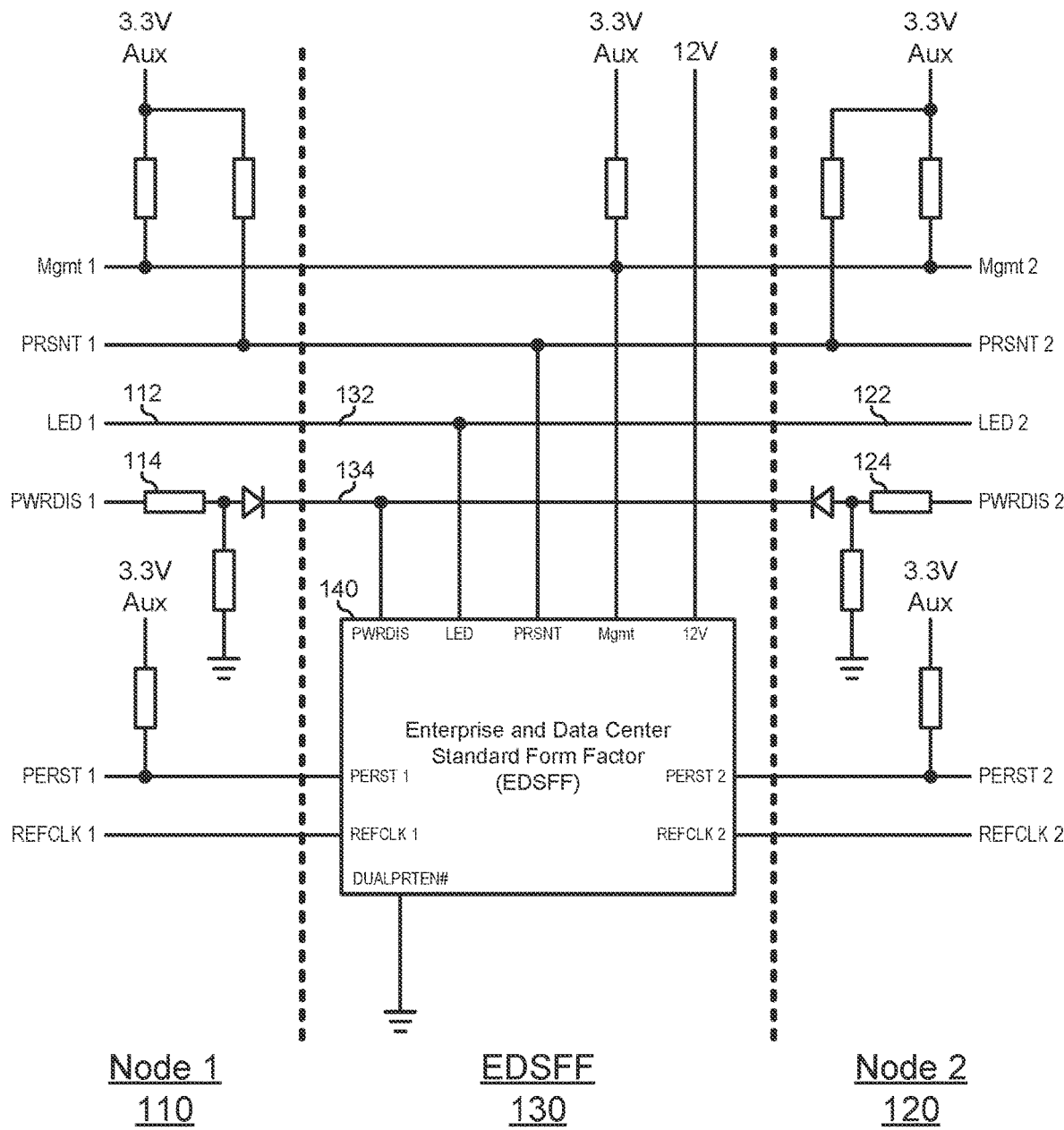
FIG. 1 is a schematic diagram of an information handling system according to an embodiment of the current disclosure.
Figure 5:
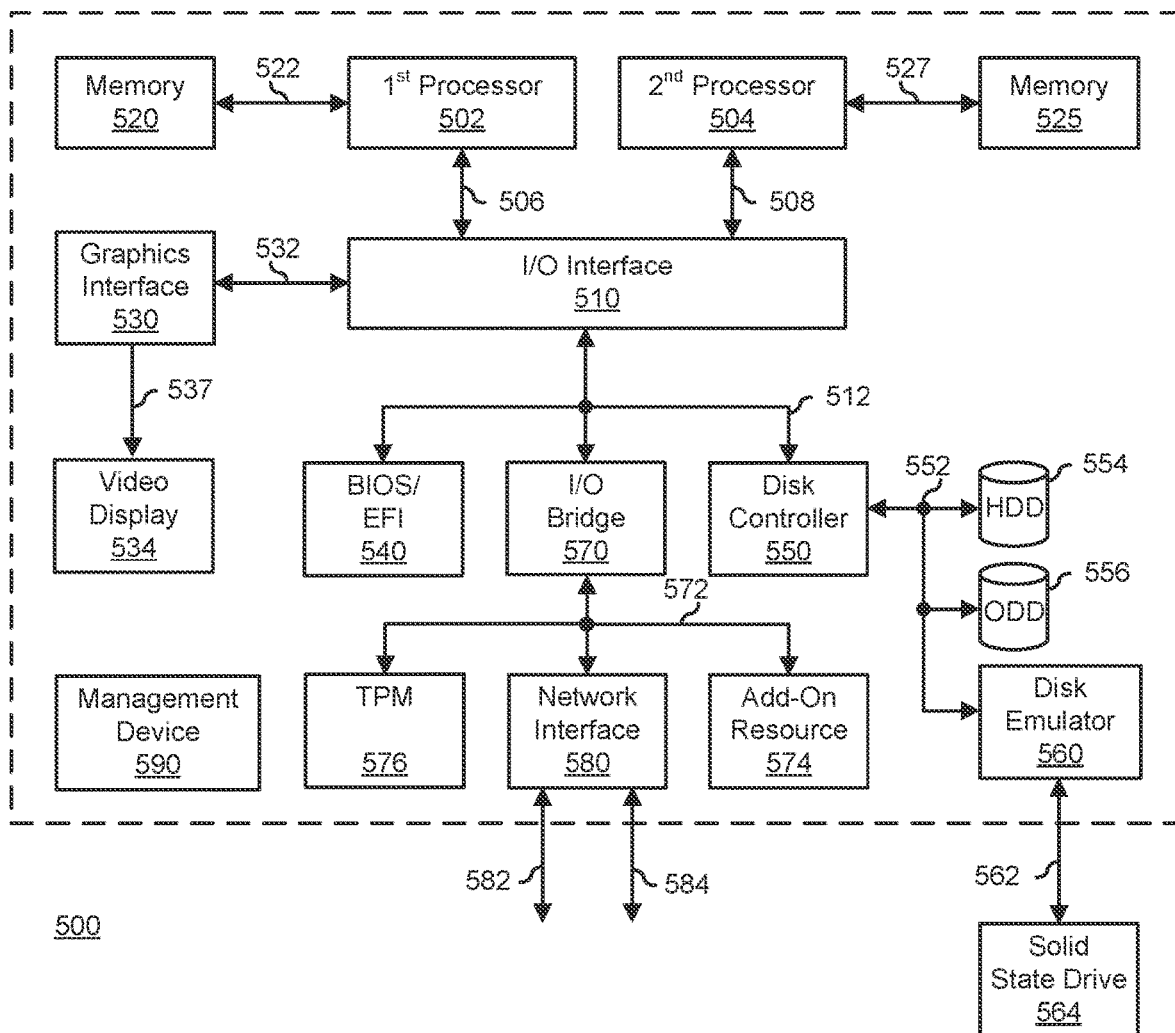
FIG. 5 is a block diagram illustrating a generalized information handling system according to another embodiment of the present disclosure.

FIG. 1 illustrates an information handling system 100 including processing nodes 110 and 120, and a shared enterprise and datacenter standard form factor (EDSFF) device 130. Information handling system 100 may be similar to information handling system 500 as shown in FIG. 5 and described below. In particular, information handling system 100 represents an enterprise system as may be utilized in a data center or the like, where EDSFF device 130 provides a high-availability (HA) storage solution to multiple processing nodes, where each of the processing nodes shares the storage capacity of the EDSFF device. Information handling system 100 is simplified to illustrate two (2) processing nodes 110 and 120 for simplicity of illustration of the current embodiments. However additional processing nodes similar to processing nodes 110 and 120 may share the storage capacity of EDSFF device 130, and the teachings of the current disclosure may be readily extended to additional processing nodes as needed or desired.

In a HA storage solution, synchronization of control information across the nodes in the solution is desirable to manage the shared EDSFF device 130. Processing nodes 110 and 120 each have direct ties to various hardware control signals of EDSFF device 130. In particular, EDSFF device 130 includes various shared control signals, including a power disable input (PWRDIS) 132, an LED control input 134, a device present output (PRSNT), a management interface (Mgmt), and a power input (12V). Power disable input (PWRDIS) 132 is an active high signal input that notifies EDSFF device 130 to power off, with processing node 110 including a power disable output (PWRDIS) 112, and with processing node 120 including a power disable output (PWRDIS) 122. LED control input 134 is a signal input that drives an amber or amber/blue LED indicator of EDSFF device 130, with processing node 110 including an LED control output 114, and with processing node 120 including an LED control output 124.

The device present output is an active low signal that indicates that EDSFF 130 is electrically attached to information handling system 100, and is provided to device present inputs (PRSNT) of processing nodes 110 and 120. The management interface (Mgmt) represents a data communication interface, such as a two-wire interface like a system management bus (SMBus), an improved inter-integrated circuit (I3C) interface, or the like, and is a shared interface with processing nodes 110 and 120. EDSFF device 130 is a dual-port device that provides a first Peripheral Component Interconnect—Express (PCIe) interface to processing node 110 and a second PCIe interface to processing node 120. The PCIe interfaces each include a number (typically 16) serial data communication lanes (not illustrated), a port reset input (PERST) and a reference clock input (REFCLK). Finally EDSFF device 130 includes a dual port enable (DUALPORTEN) input, an active low signal that indicates that information handling system 100 supports the EDSFF device in a dual port mode. The details of EDSFF device signaling are known in the art and will not be further described herein, except as may be needed to illustrate the current embodiments.

The fact that EDSFF device 130 includes shared control signals, and in particular that power disable input (PWRDIS) 132 can be driven by both power disable outputs (PWRDIS) 112 and 122, and that LED control input (LED) 134 can be driven by both LED control outputs (LED) 114 and 124, can result in various timing implications where EDSFF 130 receives conflicting input signals from processing nodes 110 and 120. As such, system requirements for dual ported EDSFF devices specify that each processing node coordinates and agrees on the state of the shared signals to ensure that there is no misalignment condition where the true state of the drive is indeterminate. Various schemes have been utilized to ensure the correct operation of HA storage systems, based upon whether the EDSFF device is a Serial Attached SCSI (SAS) device or a Non-Volatile Memory Express (NVMe) device.

Particular solutions include providing firmware and logic on SAS expanders that coordinate the LED control signals in conjunction with software management of the power disable signals, and providing firmware on baseboard management controllers (BMCs) of the processing nodes that coordinate signal states over an Intelligent Platform Management Interface (IPMI). While both solutions meet the high-level requirements, corner cases arise when the system is performing other management tasks or fault conditions arise in the firmware stack. For example, it may take a minute or more for such solutions to become fully operational after a reset. If a drive power operation is requested on one processing node while the other processing node is resetting, handshaking between the processing nodes may fail, and the drive state will be out of sync for a period of time.

Figure 2:
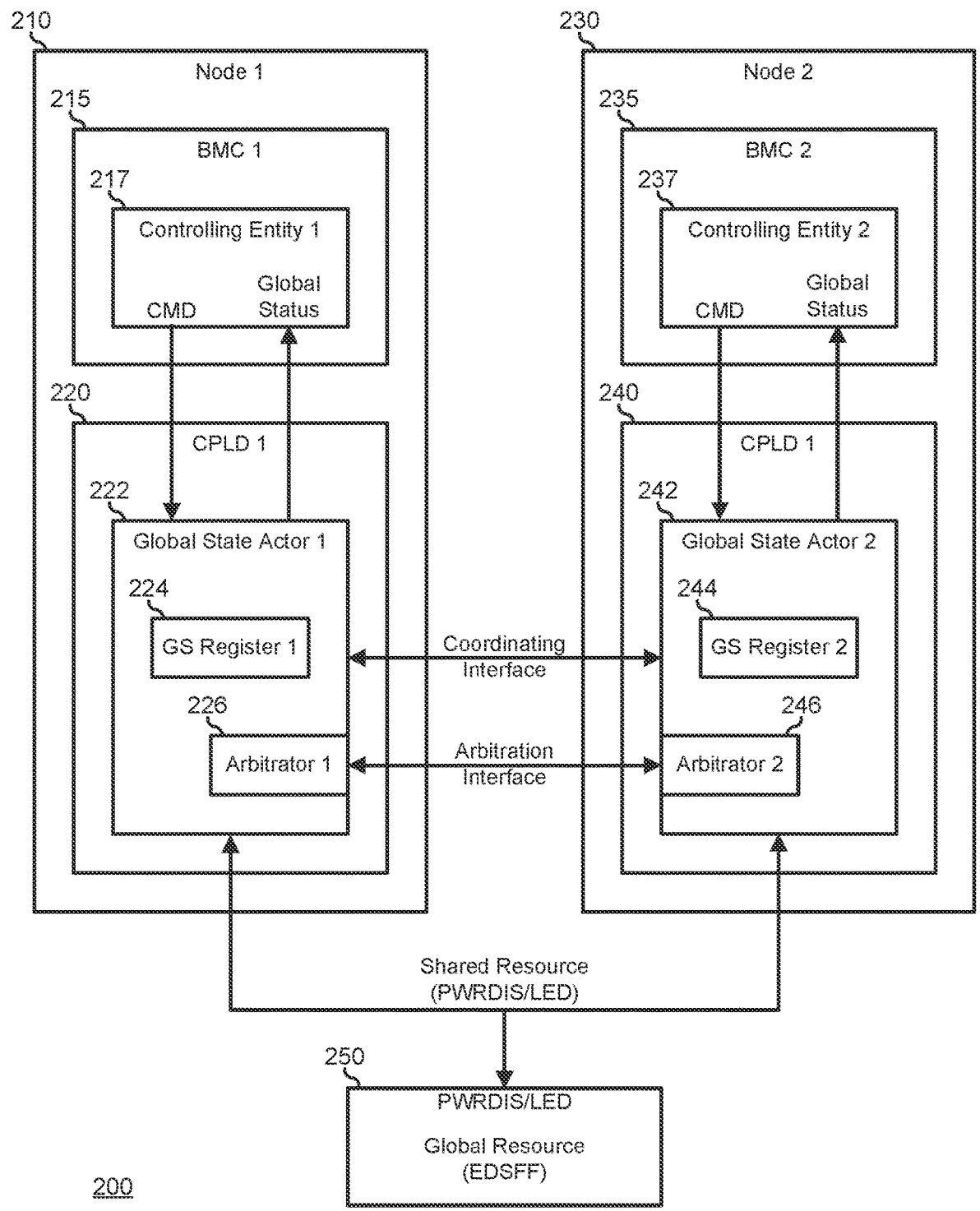
FIG. 2 is a block diagram of an information handling system according to another embodiment of the current disclosure.

FIG. 2 illustrates an information handling system 200 similar to information handling system 100, including processing nodes 210 and 230, and an EDSFF device 250. Processing node 210 includes a BMC 215, and a complex programmable logic device (CPLD) 220, and processing node 230 includes a BMC 235 and a CPLD 240. Each of processing nodes 210 and 230 may be understood to represent separate information handling systems, such as information handling system 500 as described below. For example, processing nodes 210 and 230 may represent stand-alone information handling systems that share access to EDSFF device 250, may represent server blades or sleds within a chassis system that share the access to the EDSFF device, or may represent other types of systems that share the access to the EDSFF device, as needed or desired. The details of processing nodes in a dual-port HA storage system, the generations of shared resource signals and the utilization thereof are known in the art and will not be further described herein, except as may be needed to illustrate the current embodiments.

CPLDs 220 and 240 are configured to provide the shared signal resources (e.g., the power disable outputs (PWRDIS) and the LED control output (LED)) to EDSFF device 250. CPLDs 220 and 240 represent integrated circuit devices associated with a management system of information handling system 200 that include general purpose inputs/outputs (GPIOs) that are programmable to provide various functions and features to provide monitoring, management, and maintenance of the operations of the information handling system. CPLDs 220 and 240 are configured to provide an inter-CPLD interface, as illustrated by a coordinating interface and an arbitration interface. The inter-CPLD interface may be understood to provide a proprietary communication interface between CPLDs 220 and 240, over which the functions and features of the coordinating interface and the arbitration interface operate to provide their respective functions and features, as described further below.

CPLD 220 includes a global state actor 222, which in turn includes a global state register 224 and an arbitrator 226. Similarly, CPLD 240 includes a global state actor 242, which in turn includes a global state register 244 and an arbitrator 246. In a particular embodiment, CPLDs 220 and 240 provide drive state coordination for the shared signal resources to EDSFF device 250 to ensure that any software latencies, firmware resets, and protocol overhead do not affect the timing and determinism of the shared signals resources. CPLDs 220 and 240 implement a shared global state for each of the drive slots to ensure cohesion between the processing nodes 210 and 230.

BMCs 215 and 235 operate to receive signal state commands for the shared resources from respective processing nodes 210 and 230, and to provide signal status information for the shared resources to the respective processing nodes. BMC 215 instantiates a controlling entity 217, and BMC 235 instantiates a controlling entity 237. Controlling entities 217 and 237 provide the signal state commands for the shared resources to respective CPLDs 220 and 240, and receive the signal status information from the respective CPLDs. In a particular embodiment, BMCs 215 and 235 and respective CPLDs 220 and 240 communicate via respective I2C interfaces or other management interfaces, as needed or desired.

CPLDs 220 and 240 receive the received signal state commands from respective controlling entities 217 and 237. Prior to receiving a signal state command, it will be assumed that the signal states of the shared signal resources for both of CPLDs 220 and 240 are in a common state, as indicated by the contents of respective global state registers 224 and 244. For example, the contents of global state registers 224 and 244 associated with the power disable output (PWRDIS) may be in a common low state, indicating that both of processing nodes 210 and 230 expect EDSFF 250 to be powered on, or in a common high state, indicating that both of the processing nodes expect the EDSFF to be powered off. Similarly, the contents of global state registers 224 and 244 associated with the LED control outputs (LED) will be understood to be in a common state. In this state, global state actors 222 and 242 operate to echo the common signal states to each other over the coordinating interface between the CPLDs. The echoed common signal states are provided by global state actors 222 and 242 to respective controlling entities 217 and 237.

Figure 3:
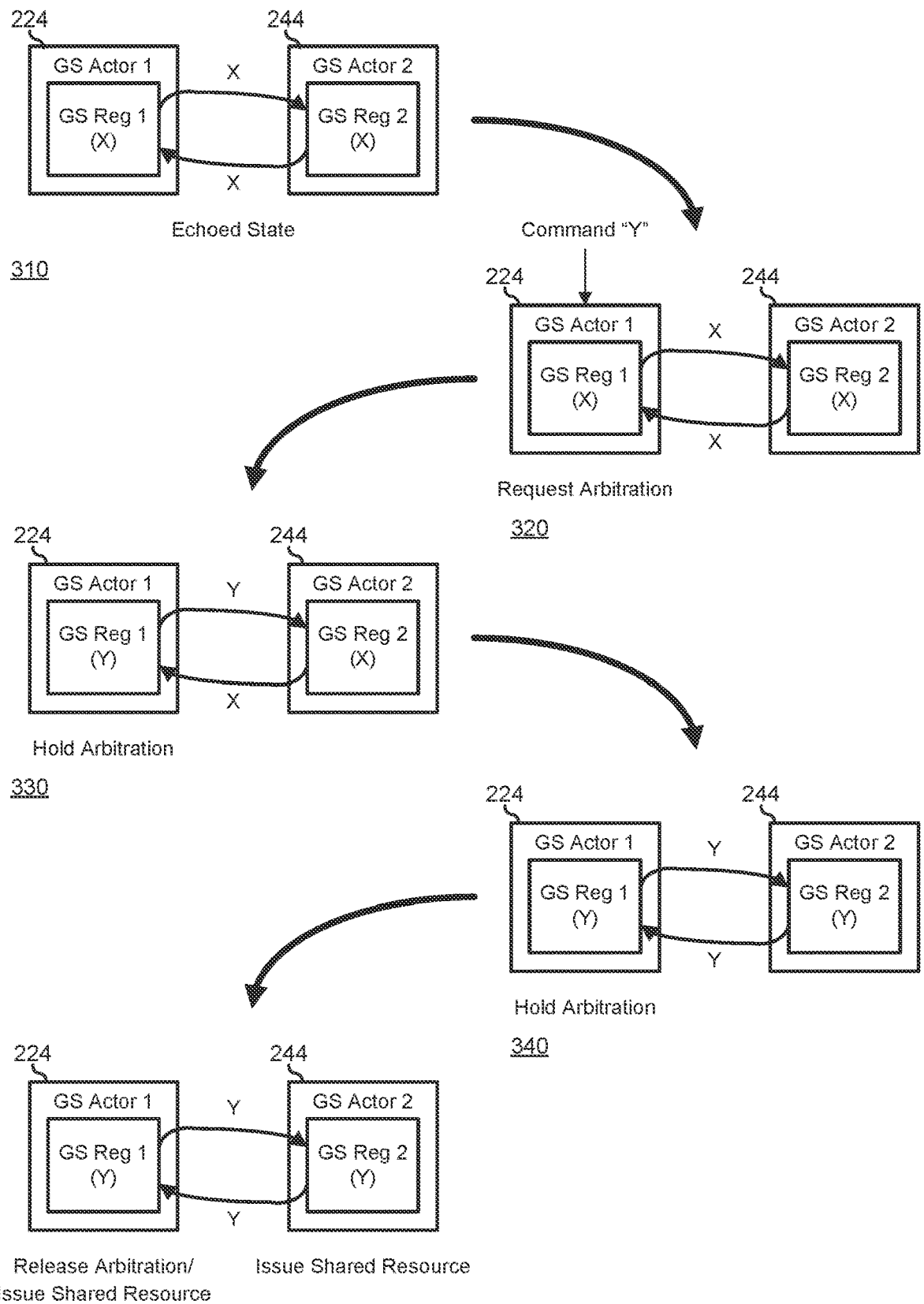
FIG. 3 illustrates utilizing a complex programmable logic device (CPLD) as an adapter for high-availability drive management in an information handling system according to an embodiment of the current disclosure.

FIG. 3 illustrates a method 300 for utilizing a CPLD as an adapter for a high-availability drive management solution in an information handling system starting at a time 310. In particular, FIG. 3 illustrates a process for information handling system 200 to modify and update the shared signal resources to EDSFF device 230. For simplicity only global state actors 222 and 242, and global state registers 224 and 244, are shown. The functions of the other elements of processing modules 210 and 230 are omitted but will be understood in view of the descriptions above. At a first time 310, the signal states of the shared signal resources for both of registers 226 and 246 are in a common state, as indicated by the contents "X" of respective the global state registers, and the contents of the registers are echoed to each other over the coordinating interface. Then at a time 320 when global state actor 222 receives a signal state command to change the state of one of the shared signal resources from "X" to "Y", the global state actor initially retains the original contents "X" within global state register 224, and requests arbitration with global state actor 242 to initiate a sync-up of the contents of global state register 244 with global state register 224.

When the arbitration is completed at time 330, global state actor 222 holds the arbitration session with global state actor 242 open and loads global state register 224 with the new shared signal resource contents "Y." Then at time 340, global state actor 222 broadcasts the new contents "Y" of global state register 224 to global state actor 242, and global state actor 242 loads global state register 244 with the new shared signal resource contents "Y" and echoes back the contents of global state register 244 to global state actor 222. Finally at time 350, global state actor 222 releases the arbitration session with global state actor 242, and both global state actors 222 and 242 issue the shared signal resource output to EDSFF device 230.

Figure 4:
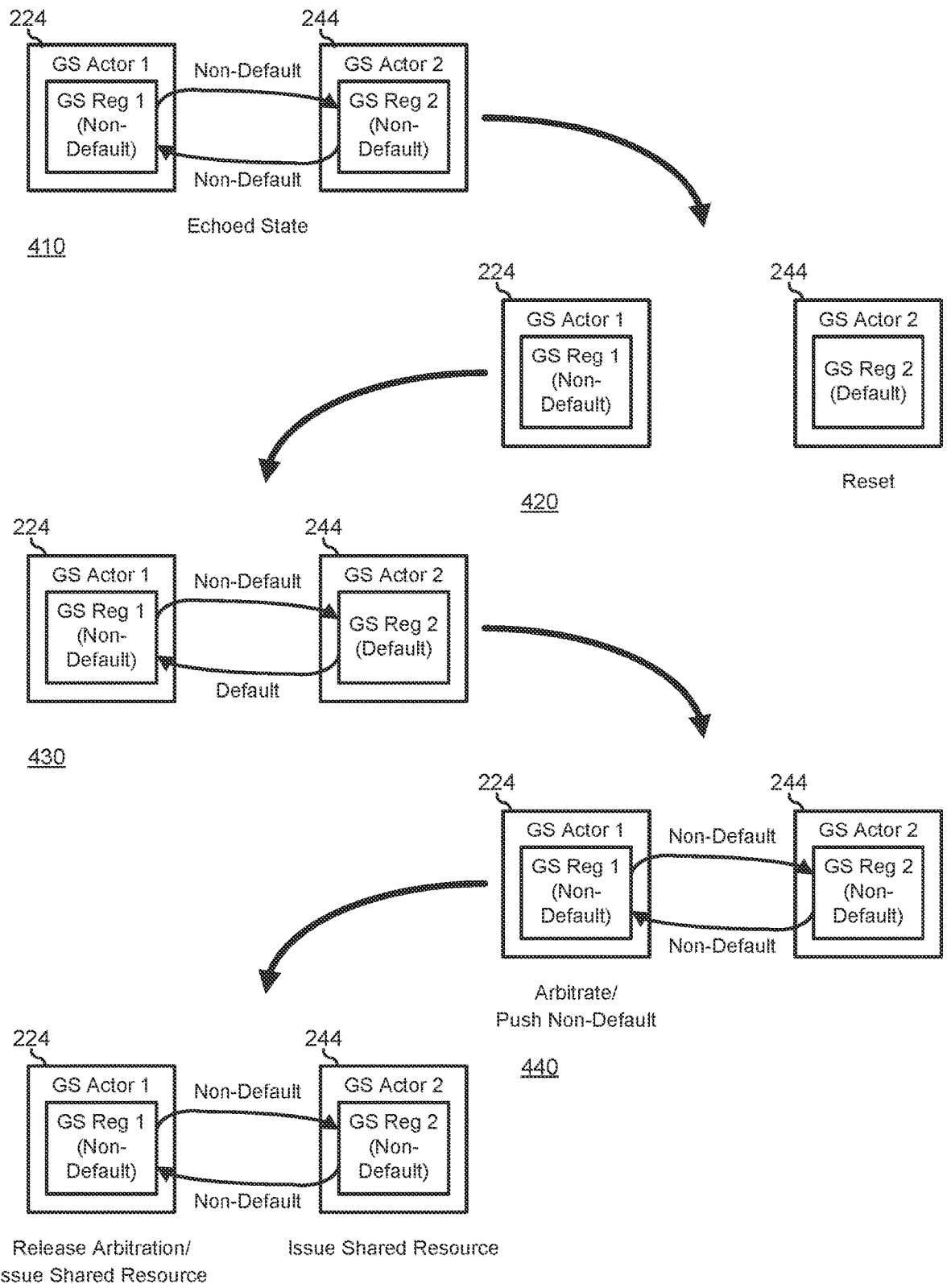
FIG. 4 illustrates utilizing a CPLD as an adapter for high-availability drive management in an information handling system according to another embodiment of the current disclosure.

FIG. 4 illustrates another method 400 for utilizing a CPLD as an adapter for a high-availability drive management solution in an information handling system. In particular, FIG. 4 illustrates a process for information handling system 200 to modify and update the shared signal resources to EDSFF device 230. At a first time 410, the signal states of the shared signal resources for both of registers 226 and 246 are in a common non-default state, as indicated by the content "Non-Default" in respective the global state registers, and the contents of the registers are echoed to each other over the coordinating interface. Then, at a time 420, one or more element of processing node 230 is reset, resulting in the contents of global state register 244 being loaded with a default state, as indicated by the content "Default."

At a time 430, the inter-CPLD interface is reinitialized, and the coordinating interface provides information from global state actor 222 to global state actor 242 that the contents of global state register 224 includes the "Non-Default" content, and provides information from global state actor 242 to global state actor 222 that the contents of global state register 244 includes the "Default" content. At time 440 global state actor 222 detects the mismatch between the contents of global state register 224 (Non-Default) and global state register 244 (Default), and arbitrates an arbitration session on the arbitration interface with global state actor 242 to push the "Non-Default" value to global state register 244, and both global state actors echo the "Non-Default" value. Finally at time 450, global state actor 222 releases the arbitration session with global state actor 242, and both global state actors 222 and 242 issue the shared signal resource output to EDSFF device 230.

FIG. 5 illustrates a generalized embodiment of an information handling system 500. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 500 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 500 can include processing resources for executing machine-executable code, such as a central processing unit (CPU), a programmable logic array (PLA), an embedded device such as a System-on-a-Chip (SoC), or other control logic hardware.

Information handling system 500 can also include one or more computer-readable medium for storing machine-executable code, such as software or data. Additional components of information handling system 500 can include one or more storage devices that can store machine-executable code, one or more communications ports for communicating with external devices, and various input and output (I/O) devices, such as a keyboard, a mouse, and a video display. Information handling system 500 can also include one or more buses operable to transmit information between the various hardware components.

Information handling system 500 can include devices or modules that embody one or more of the devices or modules described below, and operates to perform one or more of the methods described below. Information handling system 500 includes a processors 502 and 504, an input/output (I/O) interface 510, memories 520 and 525, a graphics interface 530, a basic input and output system/universal extensible firmware interface (BIOS/UEFI) module 540, a disk controller 550, a hard disk drive (HDD) 554, an optical disk drive (ODD) 556, a disk emulator 560 connected to an external solid state drive (SSD) 564, an I/O bridge 570, one or more add-on resources 574, a trusted platform module (TPM) 576, a network interface 580, a management device 590, and a power supply 595. Processors 502 and 504, I/O interface 510, memory 520, graphics interface 530, BIOS/UEFI module 540, disk controller 550, HDD 554, ODD 556, disk emulator 560, SSD 564, I/O bridge 570, add-on resources 574, TPM 576, and network interface 580 operate together to provide a host environment of information handling system 500 that operates to provide the data processing functionality of the information handling system. The host environment operates to execute machine-executable code, including platform BIOS/UEFI code, device firmware, operating system code, applications, programs, and the like, to perform the data processing tasks associated with information handling system 500.

In the host environment, processor 502 is connected to I/O interface 510 via processor interface 506, and processor 504 is connected to the I/O interface via processor interface 508.

Memory 520 is connected to processor 502 via a memory interface 522. Memory 525 is connected to processor 504 via a memory interface 527. Graphics interface 530 is connected to I/O interface 510 via a graphics interface 532, and provides a video display output 536 to a video display 534. In a particular embodiment, information handling system 500 includes separate memories that are dedicated to each of processors 502 and 504 via separate memory interfaces. An example of memories 520 and 525 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 540, disk controller 550, and I/O bridge 570 are connected to I/O interface 510 via an I/O channel 512. An example of I/O channel 512 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 510 can also include one or more other I/O interfaces, including an Industry Standard Architecture (ISA) interface, a Small Computer Serial Interface (SCSI) interface, an Inter-Integrated Circuit (I2C) interface, a System Packet Interface (SPI), a Universal Serial Bus (USB), another interface, or a combination thereof. BIOS/UEFI module 540 includes BIOS/UEFI code operable to detect resources within information handling system 500, to provide drivers for the resources, initialize the resources, and access the resources. BIOS/UEFI module 540 includes code that operates to detect resources within information handling system 500, to provide drivers for the resources, to initialize the resources, and to access the resources.

Disk controller 550 includes a disk interface 552 that connects the disk controller to HDD 554, to ODD 556, and to disk emulator 560. An example of disk interface 552 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 560 permits SSD 564 to be connected to information handling system 500 via an external interface 562. An example of external interface 562 includes a USB interface, an IEEE 2394 (Firewire) interface, a proprietary interface, or a combination thereof. Alternatively, solid-state drive 564 can be disposed within information handling system 500.

I/O bridge 570 includes a peripheral interface 572 that connects the I/O bridge to add-on resource 574, to TPM 576, and to network interface 580. Peripheral interface 572 can be the same type of interface as I/O channel 512, or can be a different type of interface. As such, I/O bridge 570 extends the capacity of I/O channel 512 when peripheral interface 572 and the I/O channel are of the same type, and the I/O bridge translates information from a format suitable to the I/O channel to a format suitable to the peripheral channel 572 when they are of a different type. Add-on resource 574 can include a data storage system, an additional graphics interface, a network interface card (NIC), a sound/video processing card, another add-on resource, or a combination thereof. Add-on resource 574 can be on a main circuit board, on separate circuit board or add-in card disposed within information handling system 500, a device that is external to the information handling system, or a combination thereof.

Network interface 580 represents a NIC disposed within information handling system 500, on a main circuit board of the information handling system, integrated onto another component such as I/O interface 510, in another suitable location, or a combination thereof. Network interface device 580 includes network channels 582 and 584 that provide interfaces to devices that are external to information handling system 500. In a particular embodiment, network channels 582 and 584 are of a different type than peripheral channel 572 and network interface 580 translates information from a format suitable to the peripheral channel to a format suitable to external devices. An example of network channels 582 and 584 includes InfiniBand channels, Fibre Channel channels, Gigabit Ethernet channels, proprietary channel architectures, or a combination thereof. Network channels 582 and 584 can be connected to external network resources (not illustrated). The network resource can include another information handling system, a data storage system, another network, a grid management system, another suitable resource, or a combination thereof.

Management device 590 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 500. In particular, management device 590 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 500, such as system cooling fans and power supplies. Management device 590 can include a network connection to an external management system, and the management device can communicate with the management system to report status information for information handling system 500, to receive BIOS/UEFI or system firmware updates, or to perform other task for managing and controlling the operation of information handling system 500. Management device 590 can operate off of a separate power plane from the components of the host environment so that the management device receives power to manage information handling system 500 when the information handling system is otherwise shut down. An example of management device 590 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 590 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
   a storage device having a plurality of control inputs;
   a first processing node including a first complex programmable logic device (CPLD) having a plurality of first outputs and a first communication interface, each first output coupled to control a state of an associated control input; and
   a second processing node including a second CPLD having a plurality of second outputs and a second communication interface coupled to the first communication interface, each second output coupled to control the state of the associated control input;
   wherein the first CPLD is configured to:
      receive a command to change the state of a particular one of the control inputs from a first state to a second state;
      direct the second CPLD to change the state of the particular control input from the first state to the second state via the first communication interface; and
      change the state of the particular control input from the first state to the second state in response to directing the second CPLD to change the state of the particular control input.

2. The information handling system of claim 1, wherein the second CPLD is further configured to indicate to the first CPLD that the second CPLD changed the particular control input from the first state to the second state via the second communication interface.

3. The information handling system of claim 2, wherein changing the state of the particular control input from the first state to the second state by the first CPLD is in response to the indication.

4. The information handling system of claim 1, wherein the first CPLD includes a first state register and the first CPLD is further configured to change contents of the first state register from the first state to the second state prior to changing the state of the particular control input.

5. The information handling system of claim 4, wherein changing the state of the particular control input is in response to changing the contents of the first state register.

6. The information handling system of claim 5, wherein the second CPLD is configured to change the state of the particular control input from the first state to the second state in response to being directed to change the state of the particular control input from the first state to the second state.

7. The information handling system of claim 6, wherein the second CPLD includes a second state register and the second CPLD is further configured to change contents of second state register from the first state to the second state in further response to being directed to change the state of the particular control input from the first state to the second.

8. The information handling system of claim 7, wherein changing particular control input from the first state to the second state by the second CPLD is in further response to changing the contents of second state register from the first state to the second state.

9. The information handling system of claim 1, wherein the storage device includes an Enterprise and Datacenter Standard Form Factor (EDSFF) device.

10. The information handling system of claim 9, wherein the control inputs include one of a power disable input and an LED control input.

11. A method comprising:
    providing, on an information handling system, a storage device having a plurality of control inputs;
    providing, on the information handling system, a first processing node including a first complex programmable logic device (CPLD) having a plurality of first outputs and a first communication interface, each first output coupled to control a state of an associated control input; and
    providing a second processing node including a second CPLD having a plurality of second outputs and a second communication interface coupled to the first communication interface, each second output coupled to control the state of the associated control input;
    receiving, by the first CPLD, a command to change the state of a particular one of the control inputs from a first state to a second state;
    directing the second CPLD to change the state of the particular control input from the first state to the second state via the first communication interface; and
    changing the state of the particular control input from the first state to the second state in response to directing the second CPLD to change the state of the particular control input.

12. The method of claim 11, further comprising providing an indication to the first CPLD that the second CPLD changed the particular control input from the first state to the second state via the second communication interface.

13. The method of claim 12, wherein changing the state of the particular control input from the first state to the second state by the first CPLD is in response to the indication.

14. The method of claim 11, wherein the first CPLD includes a first state register; and
    the method further comprises changing contents of the first state register from the first state to the second state prior to changing the state of the particular control input.

15. The method of claim 14, wherein changing the state of the particular control input is in response to changing the contents of the first state register.

16. The method of claim 15, further comprising changing the state of the particular control input from the first state to the second state in response to being directed to change the state of the particular control input from the first state to the second state.

17. The method of claim 16, wherein the second CPLD includes a second state register; and
    the method further comprises changing contents of second state register from the first state to the second state in further response to being directed to change the state of the particular control input from the first state to the second.

18. The method of claim 17, wherein changing particular control input from the first state to the second state by the second CPLD is in further response to changing the contents of second state register from the first state to the second state.

19. The method of claim 11, wherein the storage device includes an Enterprise and Data Center Standard Form Factor (EDSFF) device, and wherein the control inputs include one of a Power Disable input and a LED control input.

20. An information handling system, comprising:
 a storage device having a plurality of control inputs;
 a first processing node including a first complex programmable logic device (CPLD) having a plurality of first outputs and a first communication interface, each first output coupled to control a state of an associated control input; and
 a second processing node including a second CPLD having a plurality of second outputs and a second communication interface coupled to the first communication interface, each second output coupled to control the state of the associated control input;
 wherein the first CPLD is configured to:
  receive a command to change the state of a particular one of the control inputs from a first state to a second state;
  arbitrate a session between the first CPLD and the second CPLD via the first and second communication interfaces in response to receiving the command;
  direct the second CPLD to change the state of the particular control input from the first state to the second state via the first communication interface in response to arbitrating the session; and
  change the state of the particular control input from the first state to the second state in response to directing the second CPLD to change the state of the particular control input.

* * * * *